United States Patent [19]
Orazi et al.

[11] Patent Number: 5,121,453
[45] Date of Patent: Jun. 9, 1992

[54] POLARIZATION INDEPENDENT NARROW CHANNEL WAVELENGTH DIVISION MULTIPLEXING FIBER COUPLER AND METHOD FOR PRODUCING SAME

[75] Inventors: Richard J. Orazi; Matthew N. McLandrich, both of San Diego, Calif.

[73] Assignee: The United States of America as represented by the Secretary of the Navy, Washington, D.C.

[21] Appl. No.: 718,317

[22] Filed: Jun. 12, 1991

[51] Int. Cl.$^5$ .............................................. G02B 6/26
[52] U.S. Cl. .................................... 385/51; 385/43; 385/50
[58] Field of Search ............... 350/96.15, 96.12, 96.13, 350/96.14, 96.33; 385/51, 50, 43, 52

[56] References Cited

U.S. PATENT DOCUMENTS

| | | | |
|---|---|---|---|
| 4,557,553 | 12/1985 | McLandrich | 350/96.15 |
| 4,673,270 | 6/1987 | Gordon | 385/42 |
| 4,763,272 | 8/1988 | McLandrich | 350/96.15 |
| 4,834,481 | 5/1989 | Lawson et al. | 350/96.15 |
| 4,869,570 | 9/1989 | Yokohama et al. | 350/96.15 |
| 4,915,467 | 4/1990 | Berkey | 350/96.15 |
| 4,931,076 | 6/1990 | Berkey | 65/4.2 |
| 4,936,645 | 6/1990 | Yoon et al. | 350/96.14 |
| 4,952,017 | 8/1990 | Henry et al. | 350/96.15 |
| 4,957,338 | 9/1990 | Thorncraft et al. | 350/96.15 |
| 4,976,512 | 12/1990 | Safaai-Jazi | 350/96.33 |

OTHER PUBLICATIONS

"Polarization Independent Narrow Channel Wavelength Division Multiplexing Fiber Couplers for 1.55 m" by Matthew N. McLandrich et al., Journal of Lightwave Technology, vol. 9, No. 4, Apr. 1991.

"Single-Mode Fused Biconical Couplers for Wavelength Division Multiplexing with Channel Spacing Between 100 and 300 nm", Journal of Lightwave Tech. Jan./1988.

Primary Examiner—John D. Lee
Assistant Examiner—Phan T. Heartney
Attorney, Agent, or Firm—Harvey Fendelman; Thomas Glenn Keough; Michael A. Kagan

[57] ABSTRACT

The invention provides a method for fabricating a polarization independent narrow channel wavelength division multiplexing fiber optic coupler, comprising the steps of: holding two optical fibers in an abutting longitudinal relation along a predetermined length of the fibers; injecting light energy into one of the fibers; fusing the optical fibers together along the predetermined length to form a fused length of a fiber optic coupler; elongating the fused length of the fusing optical fibers; measuring the light energy output from the ends of the first and second fibers; ceasing the fusing and elongating when the measured light energy output from the ends of the first and second fibers indicates that a predetermined number, $N_S$, of one-half power transfer cycles have occurred in the coupler, where the $N_S$th one-half power transfer cycle occurs within a $K\pi$ phase region of a polarization envelope associated with the coupler, where K is a positive integer.

9 Claims, 7 Drawing Sheets

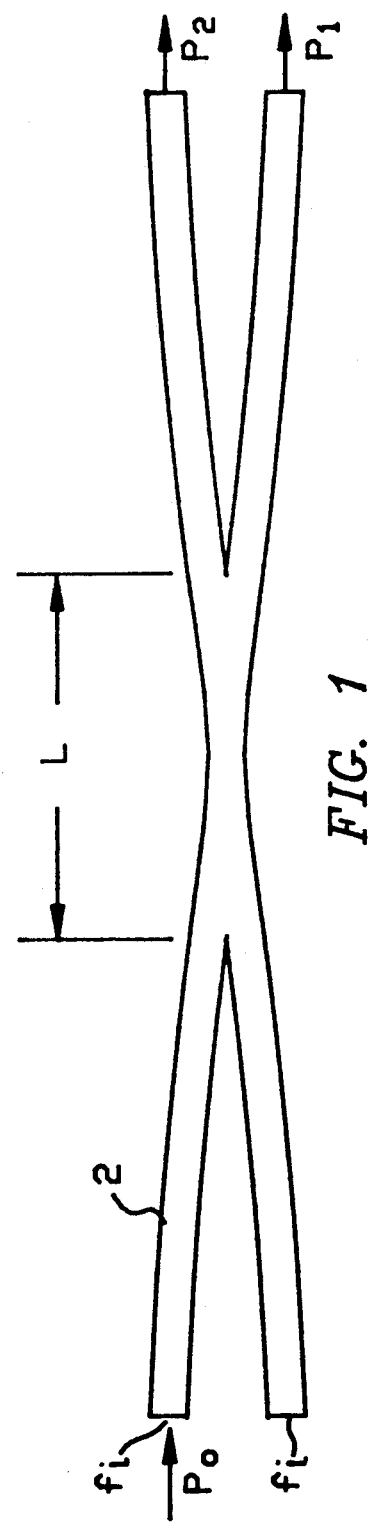

POLARIZATION INDEPENDENT NARROW CHANNEL WAVELENGTH DIVISION MULTIPLEXING FIBER COUPLER AND METHOD FOR PRODUCING SAME

STATEMENT OF GOVERNMENT INTEREST

The invention described herein may be manufactured and used by and for the government of the United States of America for governmental purposes without the payment of any royalties thereon or therefor.

BACKGROUND OF THE INVENTION

The present invention relates to the field of fused evanescent wave couplers, and more specifically to polarization independent optical fiber couplers and a method for fabricating them.

Coupling in fused single-mode fiber couplers is wavelength dependent, and this property can be used to realize optical fiber wavelength division multiplexing (WDM) components. WDM couplers operating at transmission wavelengths of 1.3 $\mu$m and 1.55 $\mu$m, corresponding to the fiber attenuation minima and to emission wavelengths of readily available laser transmitters, are commercially available. These devices exhibit typical losses of less than 0.5 dB with channel cross-talk of less than −16 dB. Cross-talk is limited by the unequal coupling coefficients for the two orthogonal polarization states which are possible at the coupler input.

For a long-haul fiber bidirectional or duplex transmission system, link length between repeaters is limited by the fiber attenuation at 1.3 $\mu$m, which is typically 0.4 dB/km. If the system were designed so that the laser transmitters operate near the minimum attenuation wavelength of 1.55 $\mu$m, where the loss is typically 0.2 dB/km, the link length could be increased significantly.

To take advantage of the minimum attenuation near 1.55 $\mu$m, and to allow for the potential use of erbium doped fiber optical amplifiers presently under development, the WDM channel separation should be less than 50 nm. This amount of wavelength separation is achieved in fiber couplers if they are strongly over-coupled, that is, their coupling lengths are long and they exhibit many power transfer cycles along their length. For such large coupling lengths, the polarization birefringence of the coupler becomes increasingly significant, and it is the birefringence that can limit the attainment of low values for the channel cross-talk.

Demonstrations of WDM couplers with channel spacings as small as 100 nm in the wavelength region near 1.3 $\mu$m have been reported. For these devices, the number of transfer cycles is 10, and the worst-case cross-talk value was determined to be −18 dB, which again is limited by the polarization birefringence of the coupler.

A typical coupler consists of a pair of single-mode fibers which have been fused together over a specified length. Coupling theory proposes that an optical signal launched into one of the input fibers escapes from the fiber core and excites the lowest order symmetric and antisymmetric modes of the waveguide formed by the fused fiber section and surrounding medium, such as air. These modes interfere along the length of the fused fibers and produce a coupler output field whose amplitude depends on the difference between the propagation constant of the two modes and the length over which the fibers are coupled. Because the propagation constants and their differences are not equal for the x and y polarizations due to the cross-sectional asymmetry, the coupler exhibits birefringence. Therefore, in general, the fraction of coupled power will not be the same for the two polarizations. This also means that for unpolarized light, which characterizes laser signals propagated over an appreciable length in fiber, an efficient low cross-talk WDM coupler, which requires 0 and 100% coupling at the two transmission wavelengths, cannot be realized unless special designs are implemented which negate the effect of the coupler birefringence.

Therefore, a need exists for a fiber optic coupler which provides 0 and 100% coupling at two transmission wavelengths where the effects of coupler birefringence are negated.

SUMMARY OF THE INVENTION

The present invention provides a polarization independent narrow channel wavelength division multiplexing fiber coupler, and a method for producing such a coupler. The method uses the polarization envelope of the coupler to determine the precise time to stop fusing and elongating the optical fibers comprising the coupler. By varying the length of the fused region, the channel wavelength separation can be fine tuned to provide a coupler having predetermined operating characteristics.

The method of the present invention includes the steps of: holding two optical fibers in an abutting longitudinal relation along a predetermined length of the fibers; injecting light energy into one of the fibers; fusing the optical fibers together along the predetermined length to form a fused length of a fiber optic coupler; elongating the fused length of the fusing optical fibers; measuring the light energy output from the ends of the first and second fibers; ceasing the fusing and elongating when the measured light energy output from the ends of the first and second fibers indicates that a predetermined number, $N_s$, of one-half power transfer cycles have occurred in the coupler, where the $N_s$th one-half power transfer cycle occurs within an $K\pi$ phase region of a polarization envelope associated with the coupler, where K represents a positive integer.

The method of the present invention allows for the production of polarization independent narrow channel wavelength division multiplexing fiber optic couplers (PINC WDM) which are free of polarization effects which can cause large cross-talk between channels. An advantage of the present invention is that it provides WDM couplers with smaller channel spacings than have previously been available and which may be used in systems where channel cross-talk must be minimized. Fiber optic couplers manufactured by the method of the present invention can be used in multiplexed long-haul communication systems where both channel wavelengths are within the minimum fiber attenuation region near 1.55 $\mu$m, greatly increasing the link length between repeaters. The fiber optic coupler produced by the method of the present invention makes it possible to use fiber amplifiers in WDM systems, since both channels could be amplified with Erbium doped fibers operating near 1.55 $\mu$m, whereas fiber amplifiers operating at 1.3 $\mu$m have not yet been developed.

BRIEF DESCRIPTION OF THE DRAWINGS

FIG. 1 illustrates a typical fiber optic coupler.

DESCRIPTION OF THE PREFERRED EMBODIMENT

The design of a polarization independent narrow channel wavelength division multiplexing coupler (PINC WDM) which negates the effect of coupler birefringence can be derived from a simple mathematical treatment of the coupled power relations. If a light signal with power $P_o = P_{ox} + P_{oy}$ is launched into one coupler input port $f_i$ of coupler 2 illustrated in FIG. 1, then the output powers P1 and P2 are given by:

$$P_1 = P_{1x} + P_{1y}$$
$$= P_{0x}\sin^2(C_xL) + P_{0y}\sin^2(C_yL)$$
$$P_2 = 1 - P_1$$

The coupling coefficients for the two polarizations, $C_x$ and $C_y$, are obtained by integrating the difference in the mode propagation constants along the effective length, L, of the coupler. Their values are determined by the coupler cross-sectional dimension, the refractive indices of the fibers and the surrounding medium, and by the wavelength of the launched signal. For a coupler of the type shown in FIG. 1, the coupler cross-sectional shape and area, and hence the local value of the coupling coefficient, varies significantly along the coupler length.

In the above expression the optical power $P_o$ has been expressed in terms of x and y components to allow for the general case where the input light can have any degree of polarization. If the input power is equally divided between the two polarizations, then $P_{ox} = P_{oy} = \frac{1}{2}P_o$, and the output powers are given by:

$$P_1 = (\tfrac{1}{2})P_o\{1 - [\cos\{(C_x+C_y)L\}][\cos\{(C_x-C_y)L\}]\}$$

$$P_2 = (\tfrac{1}{2})P_o\{1 + [\cos\{(C_x+C_y)L\}][\cos\{(C_x-C_y)L\}]\}$$

The difference $[C_x - C_y]$ is small compared to $C_x$ and $C_y$, and for small values of L, $\cos[(C_x-C_y)L] \approx 1$. For large values of L, this difference cannot be neglected and its effect is clearly observable as a polarization modulation envelope of $P_1$ and $P_2$ as a function of the elongation of the fused fibers during manufacturing. Typical experimental plots of coupled power as a function of coupler elongation for a wavelength of λ=1.55 μm are shown in FIGS. 2A and 2B.

Figure 2A:
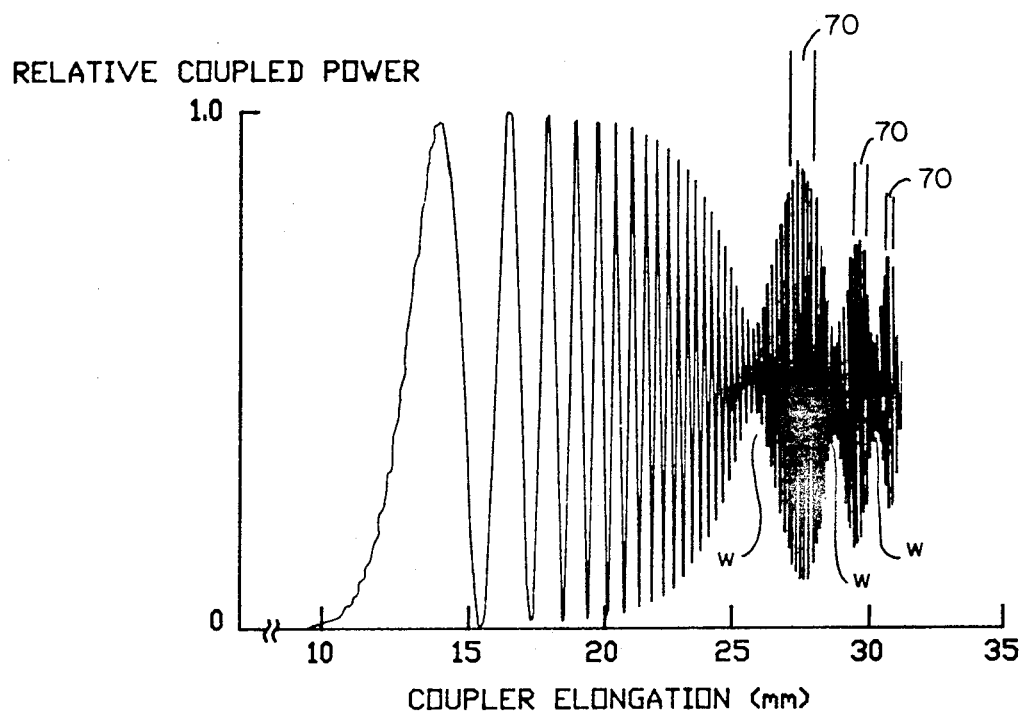
FIG. 2A is a plot of the output, $P_1$, of a fused fiber optic coupler as a function of coupler elongation for a wavelength of λ=1.55 μm, where the toggle length was ±2.5 mm.
Figure 2B:
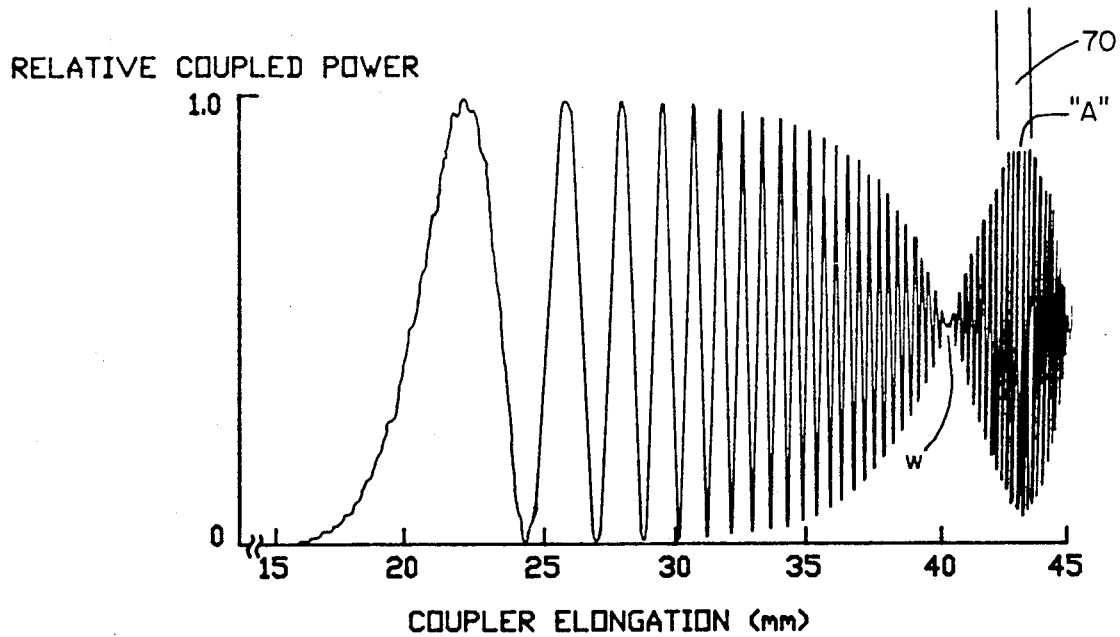
FIG. 2B is a plot of the output, $P_1$, of a fused fiber optic coupler as a function of coupler elongation for a wavelength of λ=1.55 μm, where the toggle length was ±4.0 mm.

The plots presented in FIGS. 2A and 2B show what is referred to as a polarization envelope. The polarization envelope results from the term, $\cos[(C_x-C_y)L]$, which causes a periodic change in the maximum and minimum (extremum) coupling power ratio obtainable for light that is not polarized and represents modulation of the sinusoidal power transfer observed when fabricating a coupler by the method of the present invention. An important characteristic of the polarization envelope is that is has an infinite number of waist regions, w, for unpolarized light that is input into the coupler, where the coupling ratio is essentially equal in both fibers $f_1$ and $f_2$, where $(C_x-C_y) L \approx M\pi/2$, and where M=1, 3, 5, . . . . The central region between waists w, where $(C_x-C_y) L \approx K\pi$, are referred to as $K\pi$ phase regions, where K is a positive integer. The π (K=1) phase region 70 shown in FIG. 2B is just one of an infinite number of $K\pi$ phase regions. FIG. 2A depicts three $K\pi$ phase regions 70. The polarization curves of the type shown in FIGS. 2A and 2B could theoretically be extended to reveal an infinite number of waists w and $K\pi$ phase regions 70 if sufficient data were plotted and if the elongation of the fusing fibers were unbounded by the physical constraints of finite material.

For couplers of the type represented in FIGS. 2A and 2B, there are many values of elongation for which $(C_x+C_y) L \approx N\pi$ (where N=a positive integer), corresponding to half-integer multiples of one power transfer cycle. A one-half power transfer cycle refers to extrema, both the minima and maxima, of the power coupling ratio as a function of elongation of the fusing coupler. However, if the elongation were stopped anywhere the equation $(C_x+C_y) L \approx N\pi$ is satisfied, coupler 2 would function as a WDM, with one of the channel wavelengths at the wavelength of the light source used for the input signal during fabrication. The second channel wavelength would depend on the value of N, with smaller channel spacings resulting from larger values of N. If the channel spacing is large, as in the case of a 1.3/1.55 μm WDM, where N≈5, the polarization effects are small. As N increases, the coupled power at a minimum increases while at a maximum it decreases, and therefore for larger N (smaller WDM channel separation), the cross-talk of the coupler increases. This effect is given as a limiting factor in achieving narrow channel WDM couplers. However, if the coupler elongation is made long enough, it is possible to reach the maximum in the polarization envelope where $(C_x-C_y)L \approx \pi$, as for example, shown at Point "A" in FIG. 2B where N≈79, i.e., at about the 40th maxima of the one-half power transfer cycles. At this point, nearly complete coupling can be obtained even for unpolarized light inputs.

Fabrication of a PINC WDM coupler in accordance with one method of the present invention, resulting in a coupler designed to operate at two predetermined wavelengths, includes fusing optical fibers along a fused length, while simultaneously elongating the fused length until the coupler undergoes a predetermined number of one-half power transfer cycles. However, it is first necessary to determine an appropriate number, $N_s$, of one-half power transfer cycles that must occur in the coupler while the individual optic fibers which are to comprise the coupler are being fused and elongated. Once $N_s$ is determined, couplers having these desired operating characteristics may be repetitiously constructed by subjecting them to the fusing and elongation processes until this N number is attained.

Optionally, optical fibers $f_2$ and $f_1$ could be etched to remove a predetermined thickness of the cladding, not shown, that typically surrounds the core of commercial grades of optical fiber. Techniques for etching optical fibers are well known by those skilled in this technology. The advantage of etching the fibers is that the in-process coupler does not need to be elongated to the same extent as an in-process coupler made with non-etched fibers in order to provide the same performance characteristics.

Figure 3:
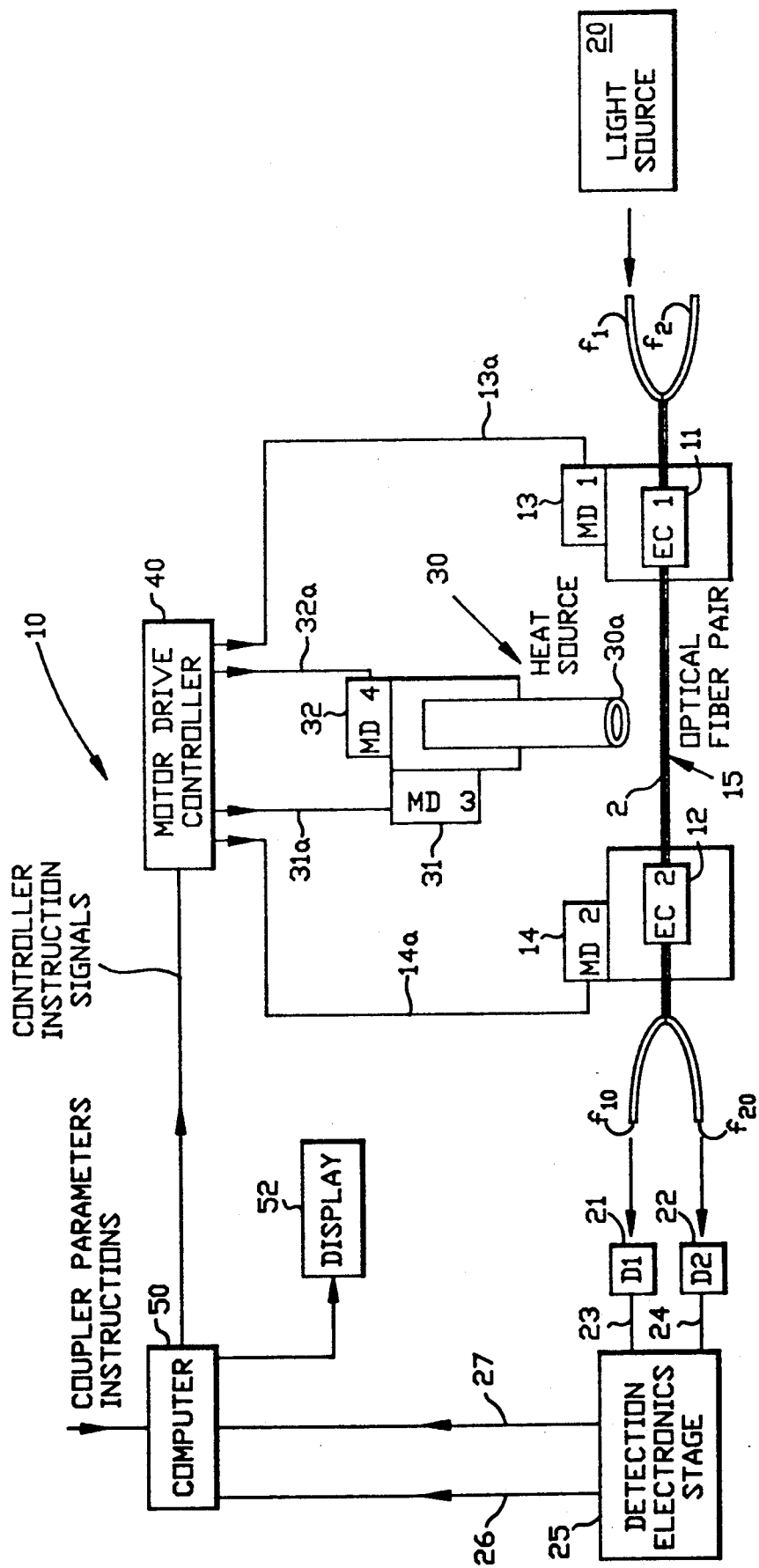
FIG. 3 is a block diagram of a computer controlled apparatus for fabricating fiber optic couplers of the present invention.

The appropriate number of power transfer cycles is obtained by first fabricating a reference coupler while monitoring and counting the power transfer cycles, and then selecting the number of power transfer cycles that will provide the desired performance characteristics. This process is described below:

Referring to FIG. 3, fibers $f_1$ and $f_2$ are positioned in a juxtaposed abutting relation between fiber clamps 11 and 12 of an apparatus of the type described in U.S. Pat. No. 4,763,272, entitled "Automatic And Computer Controlled Precision Method Of Fused Elongated Optical Fiber Coupler Fabrication," by Matthew N. McLandrich, incorporated fully herein by reference. Couplers may be fabricated from fibers such as standard single mode or dispersion shifted fibers which typically have diameters of 80 or 125 μm, although the scope of the invention includes the use of other types of single mode optical fibers. Fibers $f_1$ and $f_2$ are fused along length 15 with heat energy provided by heat source 30 directed along the length of abutting fibers $f_1$ and $f_2$. In the preferred embodiment, heat source 30 is a miorotorch fed by oxygen and propane. Heat source 30 includes torch tip 30a having dimensions, by way of example, of 3 mm long in the direction parallel to the fibers and 0.25 mm wide in the transverse direction. Heat source 30 is activated and positioned so as to subject the abutting lengths of the fibers to a gas flame which is output from torch tip 30a. Linear actuator 31 is coupled to heat source 30 so that the latter may be directed to move in a direction substantially perpendicular to the length of abutting fibers $f_1$ and $f_2$. Heat source 30 is selectively directed to translate longitudinally along length 15 of abutting fibers $f_1$ and $f_2$ from motion imparted by linear actuator 32. The motions of actuators 31 and 32 are controlled by motor drive controller 40 which receives control signals from computer 50. Linear actuator 32 is directed to toggle heat source 30, and hence torch tip 30a, back and forth while heat source 30 travels proximately along the abutting fibers. In one example of the method of the present invention, heat source 30 is toggled ±2 mm while traveling at a velocity of 0.4 mm/s. However, the toggling amplitude and travel speed may be varied to result in channel spacing selected to suit the requirements of any particular application. Toggling torch tip 30a has been found to provide smooth and gradual elongation of fused fibers $f_1$ and $f_2$ without deformities.

During the fusing process, linear actuators 13 and 14 are activated to elongate fibers $f_1$ and $f_2$ at a rate which, in one example of the preferred embodiment is 20 μm/s.

Throughout the entire elongation and fusing process, light at the nominally desired operating wavelength output from light source 20 is injected into one of the inputs of fibers $f_1$ and $f_2$ during fabrication of the reference coupler while the output power is monitored. For example, in order to fabricate a PINC WDM for 1.55 μm, light source 20 is operated near 1.55 μm. An example of such a light source is an InGaAsP laser diode. Photodiodes 21 and 22 receive the light output from ends $f_{1o}$ and $f_{2o}$ of fibers $f_1$ and $f_2$ respectively. The relative intensities of these light signals may be correlated to the degree of optical coupling between the fibers.

The analog electrical outputs of photodetectors 21 and 22 are fed to detection electronics stage 25, which converts them into corresponding digital signals. The digital signals are provided to computer 50 which monitors the optical power output of each fiber of coupler 2 and calculates the coupling power ratio. The coupling power ratio is the ratio of light power output from one arm of the coupler to the total light power output from both arms of the coupler. Computer 50 outputs this data to display 52 such as a printer, video terminal, or chart recorder. A human operator may then examine the data and select the $N_s$th one-half power transfer cycle that occurs within the coupler in order for the coupler to have operating characteristics suitable for a particular application. The $N_s$th one-half power transfer cycle is selected so that it is within the first $\pi$ phase region ($K=1$) of the polarization envelope of the coupler, although a one-half power transfer cycle in another $K\pi$ phase region (where $K=2, 3, 4 \ldots$) could be selected, depending upon the desired coupler characteristics. This will be the condition at which it is desirable to cease the fusing and elongation process. The value of $N_s$ may then be entered into computer 50.

Fabrication of a PINC WDM may be accomplished in a manner substantially similar to that for manufacturing the reference coupler, as set forth above, except that computer 50 can be programmed to halt the elongation and fusing processes just before it has been determined that $N_s$ one-half power transfer cycles have been completed. This process can also be manually halted by a human operator, as for example, by having the operator read the output of display 52 such as a Hewlett Packard Model 7046A chart recorder, and then stop the fusing and elongation process at the $N_s$th one-half power transfer cycle. The $N_s$th one-half power transfer cycle occurs at a stage in the processing of fiber coupler 2 where the $K\pi$ phase difference condition $[(C_x - C_y)L = K\pi]$ has been substantially met (the power envelope approaches an extremis). At the extremis, which may be a maximum, as indicated by Point "A" in FIG. 2B, or minimum, the coupling ratio for the two polarizations of fibers $f_1$ and $f_2$ are approximately equal at a given wavelength. The elongation may be directed to be stopped slightly before the $N_s$th one-half power transfer cycle reaches the extremis to compensate for overshoot that occurs due to inertia of the fusing apparatus, although it would be preferable to stop the fusing and elongation processes precisely at the $N_s$th one-half power transfer cycle. Preferably, computer 50 would be programmed to direct the fusing and elongation processes to be stopped at the desired stage in the fabrication of coupler 2.

Computer 50 is a digital data processor, such as an IBM personal computer, which may be programmed in accordance with the program listing presented in Appendix 1. It is to be understood that the program listing in Appendix 1 is presented by way of example only, and that the scope of the invention includes variants of this programming which would be obvious to one skilled in this technology given the appended teachings.

It is not absolutely necessary to terminate the elongation so that exactly 0 or 100 per cent coupling occurs.

Instead, the wavelength dependence of coupler 2, comprising fused fibers $f_1$ and $f_2$, can be measured after fabrication by inputting light into the coupler from a monochromator and determining the wavelengths that provide 0 and 100 per cent coupling using techniques well known by those skilled in this technology. Then, two laser transmitters, not shown, whose wavelengths match the 0 and 100 per cent coupling wavelengths, can be selected having wavelengths specifically tuned to the particular characteristics of the PINC WDM. This is feasible because emission wavelengths of individual InGaAsP laser diodes typically vary over a range from 1.52 to 1.57 μm.

In a variation of the method described above, a light transmitter of a given wavelength, such as light source 20, is used as the input light source during fabrication. Coupler elongation is stopped precisely at the appropriate value in the $K\pi$ phase region corresponding to 0 or 100 per cent coupling. Coupler output is monitored by computer 50. It is then only necessary to select the second transmitter diode to match the second channel wavelength of coupler 2. Coupler elongation may be terminated and fusing halted just before the coupling maximum (100 per cent coupling) or coupling minimum (0 per cent coupling). Then the elongation can be manually incremented step-wise using motor drive controller 40 until the exact maximum (minimum) is reached, i.e., when the number of power cycles detected by computer 50 equals $N_s$.

The fabrication process allows for control over the wavelength separation between successive maxima and minima. By varying the torch toggle length (i.e. the length of the heated region), it is possible to shift the sequence of power transfer cycles which fall within a specific $K\pi$ phase region of the polarization envelope. The $K\pi$ phase region of the polarization envelope begins where the coupling ratio for the orthogonal polarizations are approximately equal. The relative position of the $K\pi$ phase region of the polarization envelope with respect to the amount of elongation of the fusing coupler can be controlled to occur at different numbers of power transfer cycles. This shifting can be appreciated with reference to FIGS. 2A and 2B. In FIG. 2A, waist w occurs at about the 42nd one-half power transfer cycle, whereas in FIG. 2B, the waist w occurs at about the 50th one-half power transfer cycle.

Figure 4:
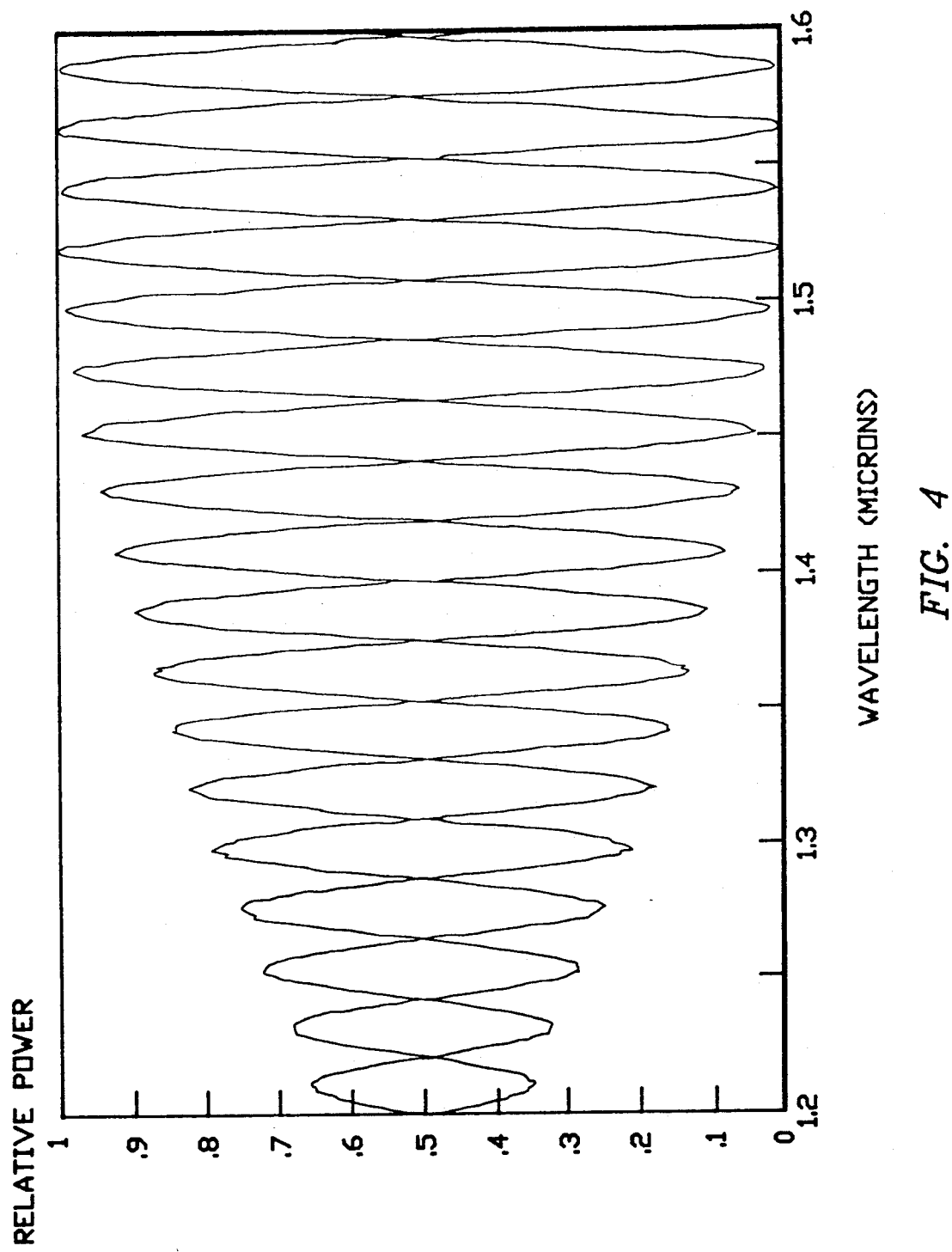
FIG. 4 is a plot of the wavelength response using unpolarized light as the input of a typical polarization independent narrow channel wavelength division multiplexing fiber coupler.
Figure 5:
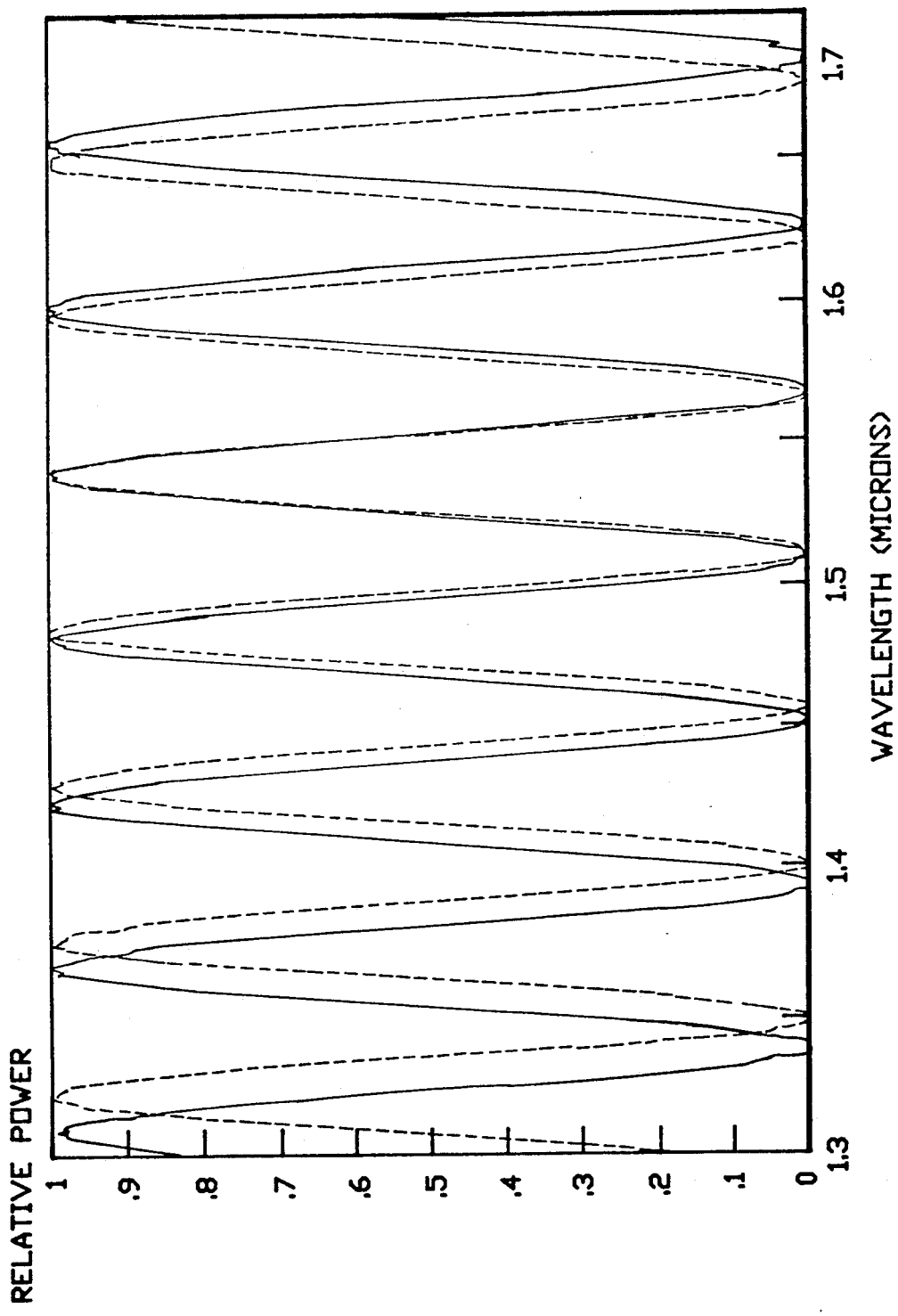
FIG. 5 is a plot of the coupled power vs. wavelength for one output channel in which the input signals are polarized parallel and perpendicular to the plane of the two fibers.
Figure 6:
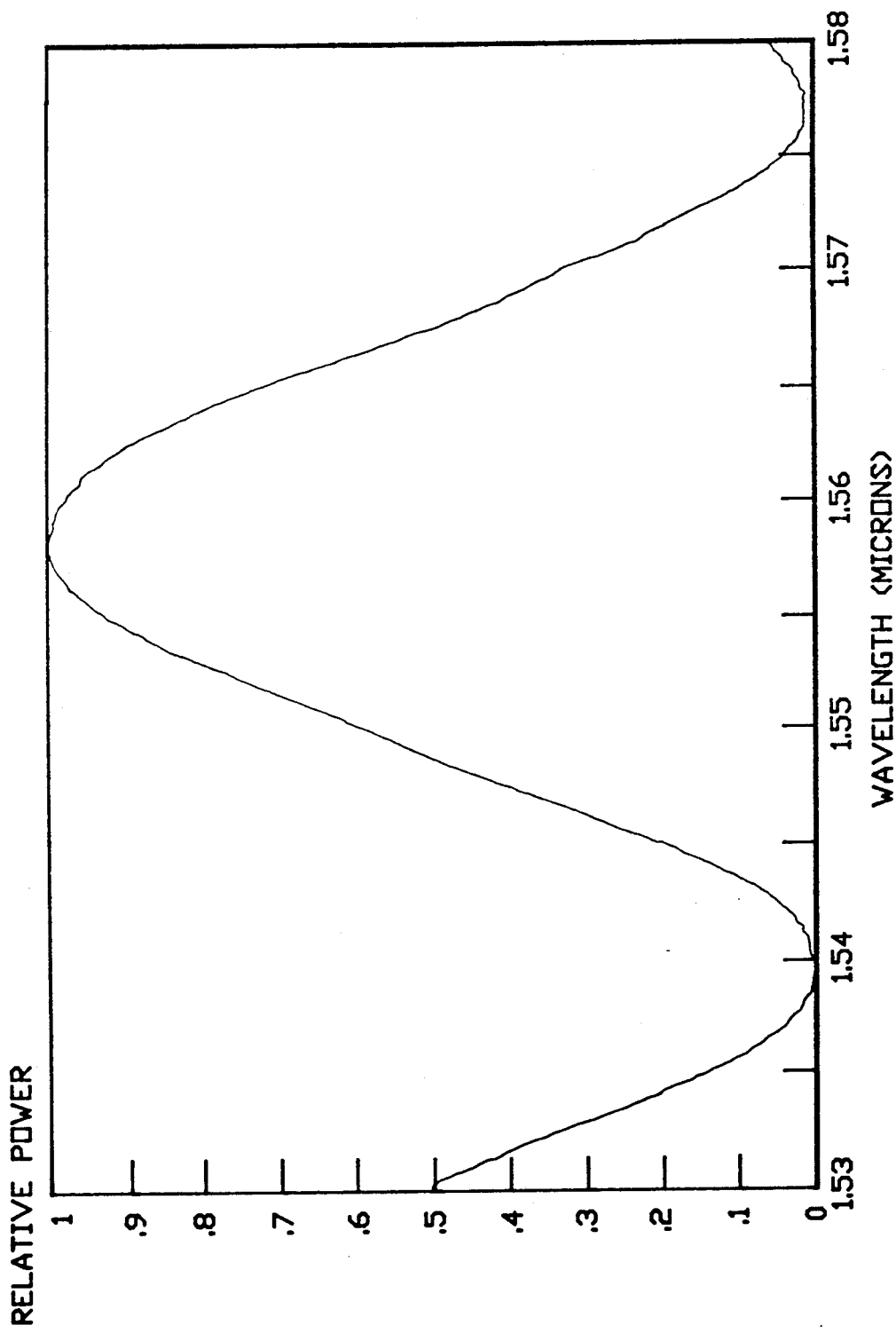
FIG. 6 illustrates the wavelength response of a coupler fabricated with a torch toggle length of ±4 mm.
Figure 7:
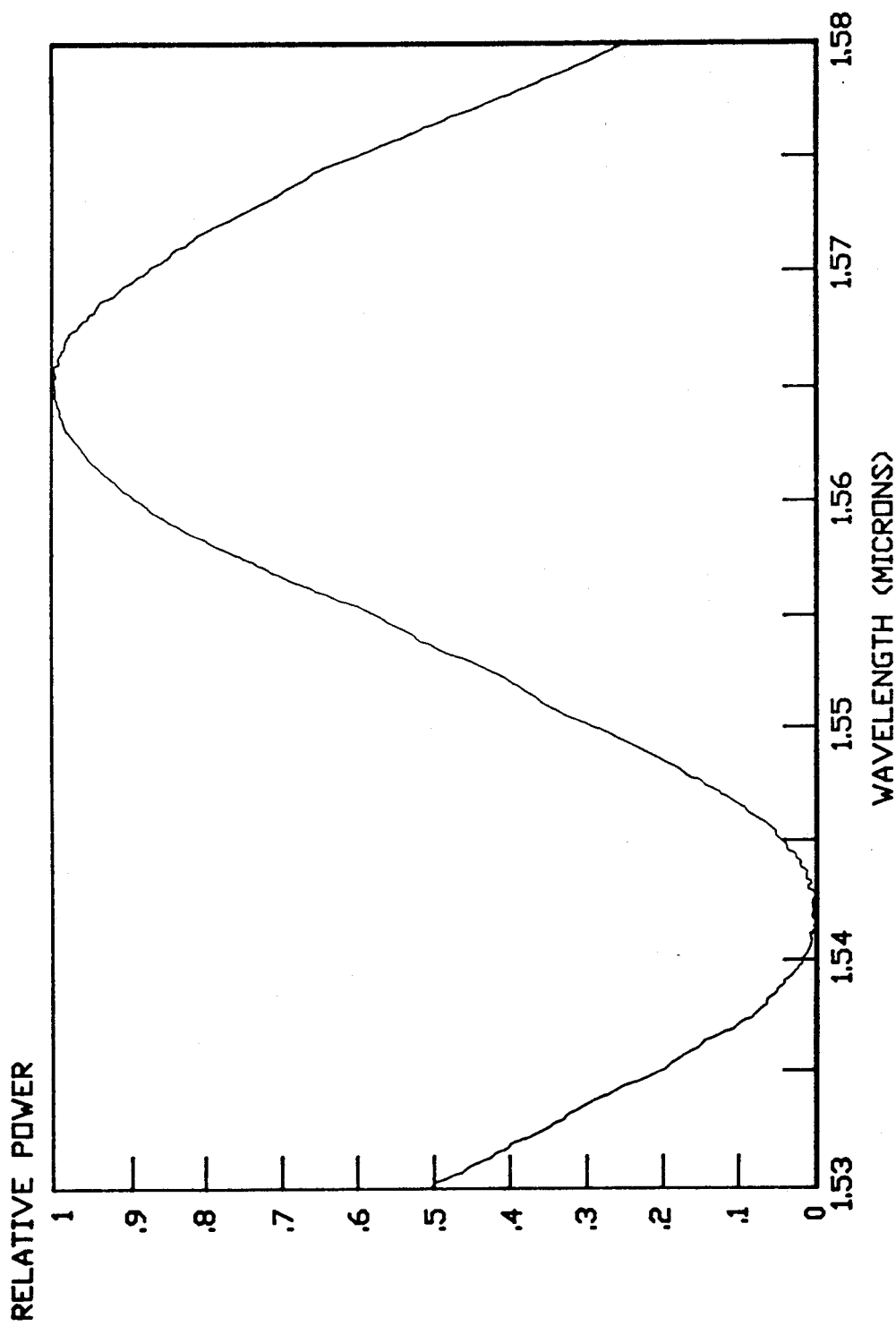
FIG. 7 illustrates the wavelength response of a coupler fabricated with a torch toggle length of ±2.5 mm.

The wavelength separation of the two channels of a coupler fabricated by the technique described in the immediately preceding paragraph is determined by the $N_s$ value at which the fabrication process is stopped. The benefit of this procedure is that it allows fabrication of a coupler having the desired channel separation at the maximum of the polarization envelope. By varying the toggle length, as for example, between 2 and 4 mm, it is possible to vary the channel separation from 25 to 18 nm while maintaining the $\pi$ phase difference condition. FIGS. 6 and 7 illustrate plots of coupled power versus wavelength for PINC WDM couplers made with different toggle values. FIG. 6 presents the wavelength response of a coupler fabricated using a toggle length of ±4 mm, which produces channel spacing of 19 nm. FIG. 7 presents the wavelength response of a coupler fabricated using a toggle length of ±2.5 mm that provides channel spacing of 23 nm. FIGS. 6 and 7 demonstrate the coupler fabrication process can be adjusted so that, given the values of the transmitter wavelengths, the coupler wavelength channels will match exactly. FIG. 4 shows a plot of the wavelength response (using unpolarized light as the input) of a typical PINC WDM manufactured with this method showing how the cross-talk between channels is minimized at the designed operating region near 1.55 μm. FIG. 5 is a plot of the coupled power vs. wavelength for one output channel in which the input signals are polarized parallel and perpendicular to the plane of the two fibers. The achievement of the required $\pi$ phase difference between the two signals, resulting in nearly equal coupled power at 1.55 μm, is confirmed by the near coincidence of the curves in the vicinity of 1.55 μm.

Once fabrication of coupler 2 is complete, it may be packaged into a casing using techniques well known by those skilled in this technology.

PINC WDM fiber couplers have been fabricated using the methods described above for operation in the 1.55 μm wavelength region. Fiber couplers designed to operate at other wavelengths could be similarly constructed, except that light having wavelengths other than 1.55 μm would be injected into one of the fibers. PINC WDMs manufactured by these methods have channel cross-talk of less than −20 dB within 1 nm of operating wavelengths with wavelength spacing $\leq 35$ nm for randomly polarized light.

Obviously, many modifications and variations of the present invention are possible in light of the above teachings. For example, other wavelength lasers can be used besides those near 1.55 μm to create polarization independent couplers at other wavelengths. Various methods can be used to heat the fibers. For example, a $CO_2$ laser could be used as a heat source because the light energy produced by such a laser is readily absorbed by optical fibers of the type used in the present invention. Also, different process parameters, such as elongation rates, may be used to fabricate the couplers. A modification to the method disclosed herein is to etch the fibers prior to the fusing process in order to reduce the amount of heating and elongation required to satisfactorily fuse the fibers. Also, other methods may be used to vary the length of the heated region of the fibers, such as changing the gas flow parameters of heat source 30. Therefore, it is to be understood that within the scope of the appended claims, the invention may be practiced otherwise than as specifically described.

What is claimed is:

1. A method for fabricating a polarization independent narrow channel wavelength division multiplexing fiber optic coupler, comprising the steps of:

holding two optical fibers in an abutting longitudinal relation along a predetermined length of said fibers;

injecting light energy into one of said optical fibers;

fusing said optical fibers together along said predetermined length to form a fused length of a fiber optic coupler;

elongating said fused length of said fusing optical fibers;

measuring said light energy output from the ends of said optical fibers; and ceasing said fusing and elongating when said measured light energy output from the ends of said optical fibers indicates that a predetermined number, $N_s$, of one-half power transfer cycles have occurred in said coupler, where said $N_s$th one-half power transfer cycle occurs within an $K\pi$ phase region of a polarization envelope associated with said coupler, where K is a positive integer.

2. The method of claim 1 wherein:

said step of injecting includes generating said light energy having predetermined wavelength;

3. The method of claim 2 which further includes the step of:

shifting a sequence of said power transfer cycles which fall within said $K\pi$ phase region of said polarization envelope by fusing said first and second fibers along a length different from said predetermined length.

4. The method of claim 3 which further includes the step of:

etching said two optical fibers before the step of fusing said optical fibers.

5. A polarization independent narrow channel wavelength division multiplexing fiber optic coupler, comprising:

a first optical fiber;

a second optical fiber operably coupled to said first optical fiber by:

holding said first and second optical fibers in an abutting longitudinal relation along a predetermined length of said fibers;

fusing said first and second optical fibers together along said predetermined length to form a fused length of a fiber optic coupler;

elongating said fused length of said fusing first and second optical fibers;

injecting light energy into one of said first and second optical fibers;

measuring said light energy output from the ends of said first and second optical fibers; and ceasing said fusing and elongating when said measured light energy output from the ends of said first and second optical fibers indicates that a predetermined number, $N_s$, of one-half power transfer cycles have occurred in said coupler, where said $N_s$th one-half power transfer cycle occurs within an $K\pi$ phase region of a polarization envelope associated with said coupler, where K is a positive integer.

6. The fiber optic coupler of claim 5 wherein:

said step of injecting includes generating said light energy having predetermined wavelength.

7. The fiber optic coupler of claim 6 wherein:

said first and second optical fibers are operably coupled by shifting a sequence of said power transfer cycles which fall within said $K\pi$ phase region of said polarization envelope by fusing said first and second fibers along a length different from said predetermined length.

8. The fiber optic coupler of claim 7 wherein:

said first and second optical fibers are etched before fusing said first and second optical fibers.

9. A polarization independent narrow channel wavelength division multiplexing fiber optic coupler, comprising:

a first optical fiber; and a second optical fiber operably coupled to said first optical fiber to form a fiber optic coupler having a channel cross-talk of less than $-20$ dB within 1 nm of a first wavelength of randomly polarized light injected into said first optical fiber, and within 1 nm of a second wavelength of randomly polarized light injected into said second optical fiber, and said fiber optic coupler having a wavelength spacing $\leq 35$ nm.

* * * * *